US009565616B2

United States Patent
Paetsch et al.

(10) Patent No.: US 9,565,616 B2
(45) Date of Patent: *Feb. 7, 2017

(54) METHOD FOR ROUTING TELECOMMUNICATION CONNECTIONS TO A MOBILE RADIO TERMINAL, AND MOBILE RADIO GATEWAY AND MOBILE RADIO TERMINAL

(75) Inventors: Frank Paetsch, Berlin (DE); Heiner Berndt, Berlin (DE)

(73) Assignee: TELES AG INFORMATIONSTECHNOLOGIEN, Berlin (DE)

( * ) Notice: Subject to any disclaimer, the term of this patent is extended or adjusted under 35 U.S.C. 154(b) by 384 days.

This patent is subject to a terminal disclaimer.

(21) Appl. No.: 14/111,745

(22) PCT Filed: Mar. 22, 2012

(86) PCT No.: PCT/EP2012/055094
§ 371 (c)(1),
(2), (4) Date: Apr. 18, 2014

(87) PCT Pub. No.: WO2012/126991
PCT Pub. Date: Sep. 27, 2012

(65) Prior Publication Data
US 2014/0220986 A1 Aug. 7, 2014

(30) Foreign Application Priority Data
Mar. 23, 2011 (DE) ........................ 10 2011 005 972

(51) Int. Cl.
*H04W 40/02* (2009.01)
*H04W 88/06* (2009.01)
(Continued)

(52) U.S. Cl.
CPC .......... *H04W 40/02* (2013.01); *H04B 1/3816* (2013.01); *H04M 3/54* (2013.01); *H04M 17/20* (2013.01);
(Continued)

(58) Field of Classification Search
CPC ....... H04B 1/3816; H04W 4/003; H04W 8/02; H04W 76/02; H04W 88/16; H04W 40/02; H04W 88/06; H04W 4/12; H04W 12/06; H04W 4/16; H04W 80/02; H04W 8/183; H04M 3/54; H04M 17/20
See application file for complete search history.

(56) References Cited

U.S. PATENT DOCUMENTS

2005/0279655 A1* 12/2005 Chen .................... H04B 1/3816
206/307.1
2007/0076760 A1   4/2007 Wennberg et al.
(Continued)

FOREIGN PATENT DOCUMENTS

DE   10311980 A1   9/2004
DE   10314144 A1   10/2004
(Continued)

OTHER PUBLICATIONS

Mouly et al, "Communication Management,"GSM System for Mobile Communications, Jan. 1, 1993, pp. 500-565, Europe Media, Lassay-Les-Chateaux, France.

Primary Examiner — Joseph Dean, Jr.
(74) *Attorney, Agent, or Firm* — Vorys, Sater, Seymour and Pease LLP; Vincent M DeLuca

(57) ABSTRACT

The invention relates to a method for routing telecommunication connections (TC connections) to a mobile communications terminal located in the reception area of a current mobile network that differs from a home network of the mobile communications terminal. The mobile communications terminal firstly has a first SIM card, which is assigned (Continued)

to the home network and to which is assigned a first telephone number.

22 Claims, 2 Drawing Sheets

(51) Int. Cl.
    *H04W 4/12*     (2009.01)
    *H04W 12/06*     (2009.01)
    *H04W 4/16*     (2009.01)
    *H04W 80/02*     (2009.01)
    *H04W 8/18*     (2009.01)
    *H04M 17/00*     (2006.01)
    *H04B 1/3816*     (2015.01)
    *H04W 4/00*     (2009.01)
    *H04M 3/54*     (2006.01)
    *H04W 76/02*     (2009.01)
    *H04W 8/02*     (2009.01)
    *H04W 88/16*     (2009.01)

(52) U.S. Cl.
    CPC ............... *H04W 4/003* (2013.01); *H04W 4/12* (2013.01); *H04W 4/16* (2013.01); *H04W 8/02* (2013.01); *H04W 8/183* (2013.01); *H04W 12/06* (2013.01); *H04W 80/02* (2013.01); *H04W 88/06* (2013.01); *H04W 88/16* (2013.01); *H04W 76/02* (2013.01)

(56) References Cited

U.S. PATENT DOCUMENTS

| | | | |
|---|---|---|---|
| 2007/0238465 A1 | 10/2007 | Han et al. | |
| 2007/0275745 A1* | 11/2007 | Owen | H04L 29/12122 455/502 |
| 2008/0287162 A1* | 11/2008 | Gaillard | H04W 88/02 455/558 |
| 2011/0130118 A1* | 6/2011 | Fan | H04M 15/00 455/411 |

FOREIGN PATENT DOCUMENTS

| | | |
|---|---|---|
| WO | WO-2006094564 A1 | 9/2006 |
| WO | WO-2010005278 A1 | 1/2010 |

\* cited by examiner

METHOD FOR ROUTING TELECOMMUNICATION CONNECTIONS TO A MOBILE RADIO TERMINAL, AND MOBILE RADIO GATEWAY AND MOBILE RADIO TERMINAL

CROSS-REFERENCE TO A RELATED APPLICATION

This application is a National Phase patent application of International Patent Application Number PCT/EP2012/055094, filed on Mar. 22, 2012, which claims priority of German Patent Application Number 10 2011 005 972.5, filed on Mar. 23, 2011.

BACKGROUND

The invention relates to a method for routing telecommunication connections (TC connections) to a mobile communications terminal. It also relates to a mobile communications gateway and a mobile communications terminal which are suitable for assisting in implementing the method.

It is known that when the user of a mobile communications terminal is in a foreign country, the mobile communications terminal maintains its connectivity by means of international roaming and hence is able to receive or make calls automatically in a foreign mobile network of the other country. At the same time, mobile network providers levy high roaming charges for international roaming, so that significant costs are associated with using roaming abroad. The same problems arise, although normally involving lower costs, whenever a mobile network is used that is not the home network of a mobile communications terminal in question.

There are also what are known as mobile communications gateways, which provide an interface between one or more mobile telecommunication networks and any other networks, for instance a fixed telecommunication network or an IP network.

A mobile communications gateway is called by the user of another network and forwards the required connection via a mobile communications channel to the mobile network in which the called subscriber is located. For this purpose, the mobile communications gateway implements the functionality of a cellular telephone and effectively acts as a cellular telephone to call the called subscriber. Mobile communications gateways therefore have the same mobile communications modules that are used in mobile communications terminals (cellphones). DE 103 14 144 A1, for instance, discloses such mobile communications gateways.

Here it is provided that a mobile communications gateway contains a multiplicity of SIM cards for the managed mobile communications channels. Any SIM cards from different network operators can be inserted. A SIM card is a plug-in card having an identity (IMSI=international mobile subscriber identity) which uniquely identifies a network subscriber and is the means by which a mobile communications device is assigned to a specific network operator and receives a specific telephone number. In addition, a SIM card comprises a PIN number (PIN—Personal Identity Number), security-related data such as communications keys and security algorithms, user-specific data such as speed-dial numbers, and network-specific data such as the identification of the region in which the user is currently staying. A SIM card personalizes a mobile communications terminal with regard to the user and the network operator and allows the network operator to bill for call charges.

In addition there are what are known as SIM servers. A SIM server provides, at a central location or in a central computer, SIM cards for mobile communication. According to demand and need, a mobile communications gateway requests a SIM card from the central computer and is provided with a SIM card by said computer. This providing of the SIM card for mobile communication is not done physically. The information that identifies a SIM card and reflects the functionality thereof is merely transferred to the mobile communications gateway by remote data transfer. Thus the SIM card is effectively located virtually on a central computer, and the functionality of the SIM card is emulated as required on the mobile communications gateway on the basis of specific information and data that are transferred from the central computer. This allows the use of a central SIM card pool for one or more mobile communications gateways. DE 103 11 980 A1, for instance, describes such SIM servers.

SUMMARY

An object of the present invention is to provide a method for routing telecommunication connections (TC connections) to a mobile communications terminal, which method reduces the costs associated with conventional roaming while still guaranteeing the connectivity of the mobile communications terminal. It is also an object of the present invention to provide a mobile communications gateway and mobile communications terminal that can be used in such a method.

A method according to the invention is based on the situation in which a mobile communications terminal is located in the reception area of a current mobile network that differs from a home network of the mobile communications terminal. For example, the mobile communications terminal is located in a foreign country in relation to the country containing the home network of the mobile communications terminal. The current mobile network, however, may also be any other mobile network in the same country. The mobile communications terminal has a first SIM card, which is assigned to the home network and to which is assigned a first telephone number.

According to an embodiment of the invention, in a first step, the first SIM card in the mobile communications terminal is replaced by a second SIM card, which is assigned to the current mobile network and to which is assigned a second telephone number. The replacement is normally a physical replacement of the first SIM card by the second SIM card by the user of the mobile communications terminal. If the mobile communications terminal is designed such that it can contain more than one SIM card at once, replacing the first SIM card by the second SIM card can also be done by deactivating the first SIM card and activating the second SIM card.

In a second step, actuated by replacing the SIM card, in the mobile communications terminal, a message comprising at least the following information is generated automatically: first, the second telephone number, which is assigned to the second SIM card, and secondly, at least one piece of information identifying the replaced SIM card. This information may be, for example, the first telephone number, which is assigned to the replaced SIM card, and/or at least one piece of identification information relating to the replaced SIM card. The at least one piece of information identifying the replaced SIM card, however, can also be a different piece of information, for example a privately agreed code or a specific identification number that has been assigned to the first, replaced SIM card.

This automatic generation of a message is performed, for example, by a software application that is implemented in the mobile communications terminal. The message is generated automatically in the sense that the software application autonomously compiles the information contained in the message and embeds this information in a message. It can be provided, however, that the application asks the user of the mobile communications terminal whether the user wants a suitable message to be generated automatically, and the user must confirm this.

In a further step, the generated message is sent automatically from the mobile communications terminal to a mobile communications gateway, the mobile communications gateway being connected directly or via a further network to the home network, i.e. the network of the first SIM card. The message is sent automatically to the mobile communications gateway. In one embodiment variant, the message is sent as an SMS message to the mobile communications gateway. The new telephone number, which is assigned to the second SIM card, is provided automatically by means of the sender information in the SMS message.

The method according to the invention may also provide that from now on, each TC connection addressed to the first telephone number is routed to the mobile communications gateway. This can be achieved, for example, by the mobile communications gateway, after receiving the message, registering in the home network of the first SIM card a partner SIM card to the first SIM card. There are also other options, however, that accomplish routing to the mobile communications gateway TC connections addressed to the first telephone number of the first SIM card (i.e. to the standard telephone number of the mobile communications subscriber).

The mobile communications gateway now uses the information contained in the message to assign such a TC connection to the second SIM card and/or to the second telephone number, which is assigned to the second SIM card. The received message informs the mobile communications gateway of the current, temporary telephone number that the mobile communications gateway has in the current mobile network and can assign the TC connection addressed to the first telephone number to this current, second telephone number or to the second SIM card.

Accordingly, the second telephone number contained in the message is now used to forward such a TC connection from the mobile communications gateway via at least one communications network to the mobile communications terminal equipped with the second SIM card.

The communications network via which the TC connection is forwarded from the mobile communications gateway usually does not comprise a mobile network (apart from the current mobile network at the destination end in which the mobile communications terminal is registered by the second SIM card thereof). Instead, a low-cost network is used, via which the connection is forwarded as far as the current mobile network in which the second SIM card is registered. A first exemplary embodiment for such a communications network is the international fixed network (TDM network), via which telecommunication information can be transferred at far lower cost than using roaming between mobile networks. In a further exemplary embodiment, the communications network via which the mobile communications gateway routes the TC connection to the current mobile network is an IP network such as e.g. the Internet.

Thus using standard mobile communications functions, local SIM cards and a mobile communications gateway, the method according to the invention circumvents conventional roaming and thereby achieves a significant potential cost saving. A mobile communications user employing a cheaper local SIM card e.g. during a stay abroad can still communicate conveniently and economically with users in the home mobile network by means of the method according to the invention. In addition, no further devices apart from the normal mobile communications terminal of the user are employed in the current mobile network, and the user is not dependent on any Internet connections. All incoming and outgoing calls work as normal, while avoiding the costs associated with traditional roaming.

In addition, in order to implement the method according to the invention, the mobile communications user does not need WLAN hotspots, mobile Internet connections or a suitable VoIP solution, some of which can also result in significant costs. Nonetheless, the user can still be reached under the known mobile number.

It is pointed out that within the meaning of the present invention, the term "SIM card" denotes any plug-in card that uniquely identifies a network subscriber so that a mobile communications device containing such a plug-in card can be assigned to a specific network operator and can receive a specific telephone number. Thus the term "SIM card" denotes not only plug-in cards for identifying a network subscriber in the GSM standard, but also plug-in cards for identifying a network subscriber in any other current or future mobile communications standard.

As already mentioned, in one embodiment variant of the invention, the mobile communications terminal is initially located in a foreign country in relation to the country containing the home network of the mobile communications terminal. The current mobile network is in this case a foreign mobile network, and the first SIM card is replaced by a second SIM card, which is assigned to the foreign mobile network.

In an embodiment of the invention it is provided that a TC connection addressed to the first telephone number, i.e. a TC connection addressed to the mobile communications terminal from or via the home network of the mobile communications terminal, is initially routed to the mobile communications gateway by registering, when the message is received, the mobile communications terminal in the home network at the location of the mobile communications gateway by means of a SIM card in the mobile communications gateway. From the viewpoint of the caller and the home network, the mobile communications terminal in question is now located at the location of the mobile communications gateway, and all calls are routed to or from the relevant SIM card in the mobile communications gateway.

For this purpose, it is provided in one embodiment variant that a partner SIM card to the replaced SIM card is used to register the mobile communications terminal in the home network. In one embodiment, the partner SIM card is already located in the mobile communications gateway and is activated at the latest when the mobile communications gateway receives the message from the mobile communications terminal regarding the replacement of the SIM card in the terminal. The partner SIM card can then be assigned using the at least one piece of sent information, which identifies the replaced SIM card.

Alternatively, it can be provided that the partner SIM card is arranged in a SIM server, and only the data that is relevant to an authentication in the home network is transferred to the mobile communications gateway, where the SIM card is emulated. The data relevant to an authentication in the home network is transferred to the mobile communications gateway when the message generated in the mobile communications terminal is received at the mobile communications gateway and/or at the SIM server. It can be provided here that the message is received initially at the mobile communications gateway, which then notifies the SIM server of the receipt of the message, whereupon the data relevant to an authentication in the home network is sent by the SIM server to the mobile communications gateway. It can likewise be provided that the message generated automatically in the mobile communications terminal is sent via the SIM server to the mobile communications gateway and hence is available first in the SIM server, whereupon the SIM server sends the data relevant to an authentication in the home network to the mobile communications gateway.

Partner SIM cards are known per se. A partner SIM card is a SIM card that is assigned the same telephone number as the actual SIM card but has a different IMSI. The partner SIM card must already have been requested and be present before the method is implemented.

In an alternative embodiment variant, a TC connection addressed to the first telephone number is routed to the mobile communications gateway in that the mobile communications terminal, before the SIM card is replaced, configures permanent call forwarding to the mobile communications gateway. This permanent call forwarding can be configured automatically or manually before the SIM card is replaced. It must be noted here that according to the applicable standards, permanent call forwarding is not affected by roaming, in particular any costs associated with roaming do not arise in the case of permanent call forwarding.

As a result of the configured permanent call forwarding, TC connections addressed to the first telephone number are automatically routed to the first mobile communications gateway. In this case it can be provided that a TC connection addressed to the first telephone number is routed to a specific SIM card contained in the mobile communications gateway or provided to the mobile communications gateway by a SIM server. It can likewise be provided that call forwarding is made to a SIM card that is assigned flexibly via a SIM server. In the latter case, access can be made in this respect to a pool of SIM cards in a SIM server.

In one embodiment variant of the present invention, the message that is automatically generated in the mobile communications terminal on replacing the SIM card contains at least the second telephone number, which is assigned to the second SIM card, and the IMSI of the first, replaced SIM card. The second telephone number, which is assigned to the second SIM card, is necessarily contained in the message because it constitutes the temporary telephone number of the mobile communications terminal to which TC connections routed to the mobile communications gateway are meant to be forwarded. The mobile communications gateway can use the IMSI to determine which network subscriber is involved. The IMSI is also important for billing purposes. In addition, the mobile communications gateway can use the IMSI to obtain, if necessary, also the first standard telephone number of the mobile communications terminal.

Alternatively, the message contains instead of the IMSI the first telephone number together with the second telephone number. In a further variant, the message contains both telephone numbers and the IMSI. The first SIM card can also be identified in another way, however, for example by means of an agreed identification number.

The second SIM card, for example, is a prepaid SIM card. Such a card can be obtained particularly easily abroad and inserted in the mobile communications terminal. In principle, however, the second SIM card can also be a SIM card obtained by a contract with a foreign mobile network operator.

The message generated in the mobile communications terminal can be sent directly or via a SIM server to the mobile communications gateway. It can also be provided here that all the mobile communications gateway functions, or at least the mobile communications gateway functions relevant to the present method, can be supervised via a SIM server.

The method according to the invention considers both telephone calls and SMS messages to be TC connections. Just like incoming calls, incoming SMS messages can also be forwarded at low cost using the method according to the invention. The method according to the invention similarly also makes it possible to implement outgoing calls from the mobile communications terminal at low cost. Such outgoing calls are implemented, for example, by means of a callback or a multi-stage dialing process (e.g. two-stage dialing).

The invention also relates to a mobile communications gateway having the following features:
  a plurality of radio modules for mobile communication, wherein a plurality of SIM cards are assigned or can be assigned to the mobile communications gateway, each of which enable use of a radio module for mobile communication,
  means that are suitable for detecting a message sent from a mobile communications terminal to the mobile communications gateway, which message comprises the following information: the telephone number of a second SIM card, which is assigned to a current mobile network, wherein a first SIM card, which was originally inserted in the mobile communications terminal and is assigned to a home network, has been replaced by the second SIM card, and at least one piece of information assigned to the first, replaced SIM card, which piece of information may be, for example, the first telephone number and/or at least one piece of identification information relating to the first, replaced SIM card,
  means which use the information contained in the message to assign to the second SIM card and/or to the second telephone number, which is assigned to said SIM card, a TC connection addressed to the first telephone number of the mobile communications terminal and routed to the mobile communications gateway, and
  means which use the second telephone number contained in the message to forward to the mobile communications terminal equipped with the second SIM card a TC connection addressed to the first telephone number of the mobile communications terminal and routed to the mobile communications gateway.

One embodiment here provides that a SIM card that is the partner SIM card to the first SIM card in the mobile communications terminal is assigned to the gateway, wherein the partner SIM card is registered in the home network anyway when the message is received, so that each TC connection addressed to the first telephone number is initially routed to the mobile communications gateway and is then forwarded from this gateway to the temporarily assigned second telephone number.

The invention also relates to a mobile communications terminal having the following features:
- means which detect a replacement of a first SIM card, which is assigned to a home network, by a second SIM card, which is assigned to a current mobile network,
- means which, actuated by the replacement of the SIM card, automatically generate a message that comprises at least:
  - the second telephone number, which is assigned to the second SIM card, and
  - at least one piece of information identifying the replaced SIM card,
- and means which, after the SIM card is replaced, send the message from the mobile communications terminal to a defined telephone number that is assigned to a mobile communications gateway.

In one embodiment of the mobile communications terminal according to the invention, the means which automatically generate a message are designed to detect the IMEI of the first SIM card and after the SIM card is replaced to write the IMEI in the message to be sent out.

In a further embodiment, the means which automatically generate a message generate the message in the form of an SMS message, wherein the new telephone number, which is assigned to the second SIM card, is provided by the sender information in the SMS message.

The means which implement the mobile communications terminal functionalities specified in claim 19 are provided, for example, by a software application in the mobile communications terminal. Such a software application is also known as a soft client.

BRIEF DESCRIPTION OF THE DRAWINGS

The invention is described in greater detail below using a plurality of exemplary embodiments and with reference to the figures in the drawing.

DETAILED DESCRIPTION

Figure 1:
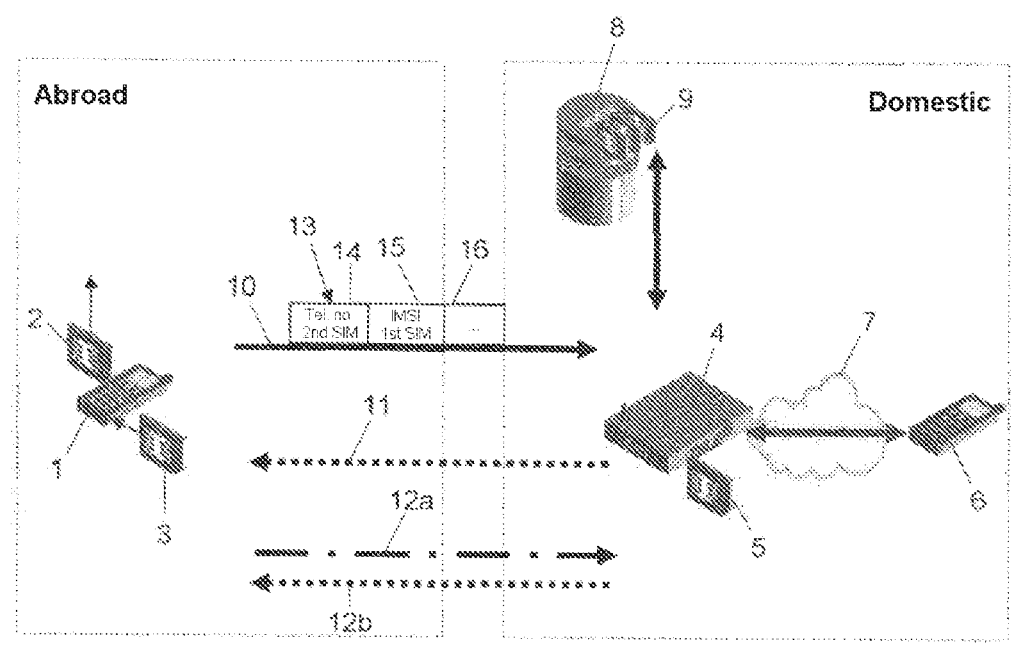
FIG. 1 shows a telecommunication arrangement which is suitable and designed for implementing the method according to the invention.

FIG. 1 shows a telecommunication arrangement which comprises networks and telecommunication components that can be used to implement a method according to the invention for routing TC connections to a mobile communications terminal.

The communication arrangement comprises as essential components a mobile communications terminal 1 and a mobile communications gateway 4. A SIM server 8 is optionally provided in addition. The mobile communications gateway 4 is connected to a home network 7 of the mobile communications terminal 1.

FIG. 1 considers the situation in which the mobile communications terminal 1 and the user thereof are located abroad. The term "abroad" is used here to distinguish the location from the country or region containing the home network ("domestic") of the mobile communications terminal. In further exemplary embodiments to which the following embodiments apply correspondingly, on the other hand, the mobile communications terminal 1 and the user thereof are not located abroad but in the country or region in which the home network is also implemented.

The mobile communications terminal is assigned a first SIM card 2, which uniquely identifies a network subscriber and which assigns the mobile communications terminal 1 to the home network 7. The SIM card here has an IMSI number, as is known per se. It is now provided that the first SIM card 2 of the mobile communications terminal 1 located abroad is replaced by a second SIM card 3, for example a prepaid SIM card. The second SIM card 3 is assigned to a foreign mobile network.

The mobile communications gateway 4 comprises a plurality of radio modules for mobile communication. The mobile communications gateway is here assigned a plurality of SIM cards, each of which enable use of a radio module for mobile communication. At least some of the SIM cards in the mobile communications gateway 4 are here assigned to the home network 7, so that a radio module of the mobile communications gateway 4 itself constitutes a mobile communications terminal for mobile communication via the home network 7 with a further mobile communications terminal 6.

It can also be provided that the home network 7 is interconnected to further mobile networks and/or to one or more telecommunication fixed networks, and the further mobile communications terminal 6 is not connected to the home network 7 directly but via one or more further networks.

The optionally provided SIM server 8 has a pool of SIM cards 9. The SIM server 8 provides as required a SIM card 9 to the mobile communications gateway 4, although such a SIM card 9 is not provided physically, but the information that identifies a SIM card and reflects the functionality thereof is merely transferred to the mobile communications gateway 4 by data transfer.

The situation is considered below in which for the mobile communications terminal 1 located abroad, the first SIM card 2, which is assigned to the home network 7, is removed and replaced by the SIM card 3 assigned to a foreign mobile network. This replacement can be done physically, for example. The mobile communications terminal 1 comprises a software application which, actuated by such a replacement of the SIM card, automatically generates a message 13 (see FIG. 1).

This message 13 comprises as pieces of information 14, 15 at least the telephone number of the second SIM card 3 and the IMSI number of the first SIM card 2, which has since been replaced. In addition, the message 13 can contain further information 16. The message 13 is only shown schematically in FIG. 1. The precise structure of the message 13 may be different. The information 13 is sent, for example, automatically by SMS 10 to the mobile communications gateway 4. The sending of an IMSI number is again intended merely as an example. Instead of this, any other piece of information that enables the second SIM card to be identified at the mobile communications gateway 4 can also be sent.

The mobile communications gateway 4 is able to identify a partner SIM card 5 of the first SIM card 2 using the received IMSI number. The relevant partner SIM card 5 is located either physically already in the mobile communications gateway 4 or is assigned to the mobile communications gateway 4 by the SIM server 8.

Figure 2:
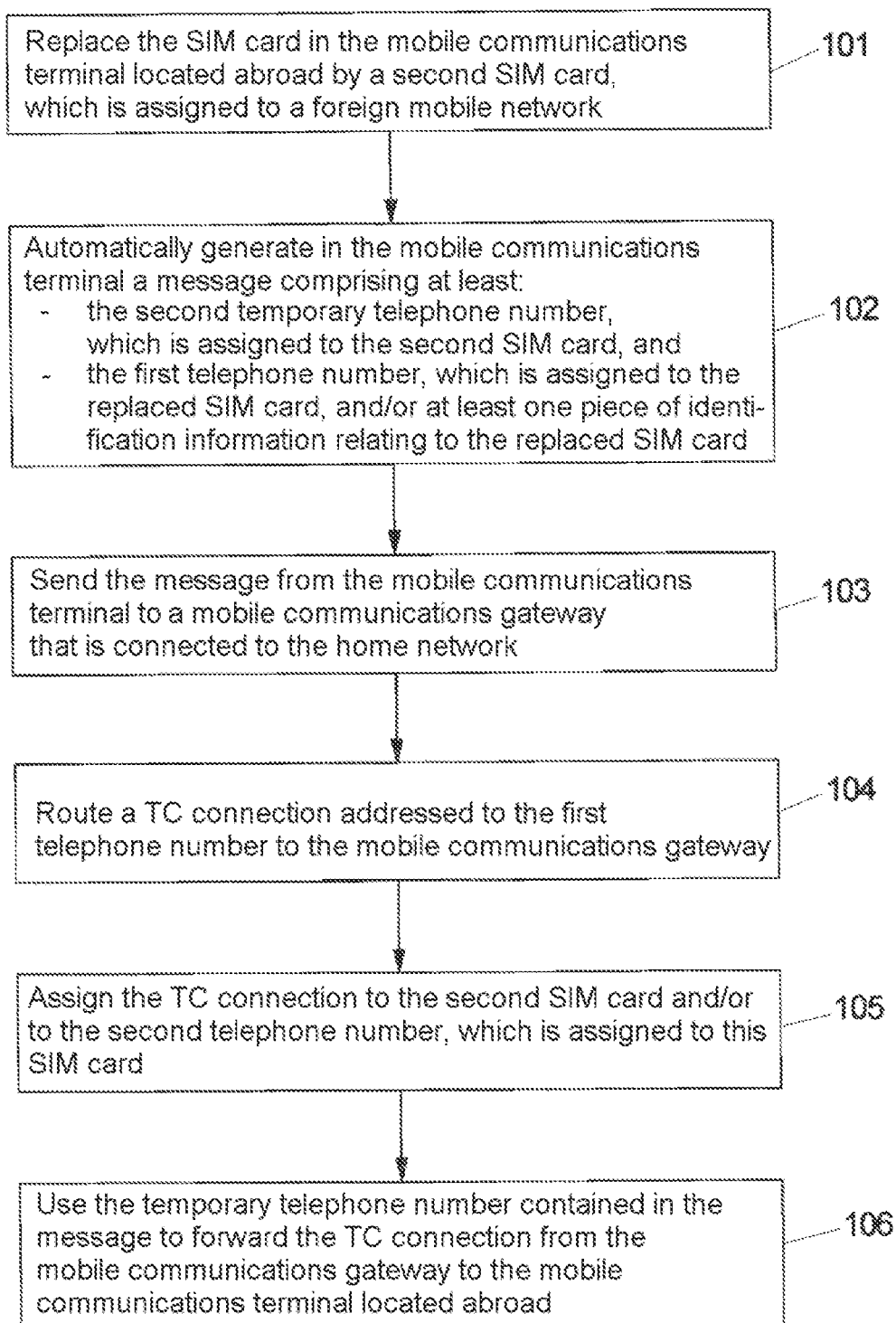
FIG. 2 shows a flow diagram which defines the steps of an example of a method according to the invention for routing TC connections to a mobile communications gateway.

FIG. 2 shows the relevant method steps again in chronological order. In a first step 101, the SIM card 2 of the mobile communications terminal 1, which is located abroad for example, is replaced by a second SIM card 3, which is assigned to a foreign mobile network. Thereupon in step 102, a software application in the mobile communications terminal 1 generates in the mobile communications terminal 1 a message 13 comprising at least: the second, temporary telephone number, which is assigned to the second SIM card 3, and at least one piece of identifying identification relating to the replaced SIM card 2, where the IMSI number is preferably used as this identification information.

It is likewise possible here that the message includes instead of or in addition to the IMSI number, the first telephone number, which is assigned to the first SIM card 2. Since the IMSI number and the first telephone number are assigned to one another, it is sufficient to transmit one piece of this information if the mobile communications gateway 4, by knowing the one piece of information, is able to obtain the other piece of information.

In step 103, the generated message 13 is then sent as an SMS or in another way (e.g. via an IP network) by the mobile communications terminal 1 to the mobile communications gateway 4. This message can be sent directly, as shown in FIG. 1. In an alternative embodiment, it is equally possible that the message is sent to the SIM server 8, which then sends the message to the gateway 4, if applicable including information about an assigned partner SIM card.

By registering the partner SIM card 5 in the home network 7, TC connections addressed to the first telephone number (the standard SIM card 2) are from now on routed from the home network 7 to a radio module of the mobile communications gateway 4 in which the partner SIM card 5 is inserted. All the TC connections addressed to the first telephone number are thereby routed to the mobile communications gateway 4; see step 104 in FIG. 2.

Using the information in the SMS received from the mobile communications terminal 1, it is now possible for the mobile communications gateway 4 to assign a TC connection, which was routed to the mobile communications gateway 4 and made using the telephone number of the first SIM card 2, to the current SIM card 3 and the current, temporary telephone number of the mobile communications terminal 1 in the foreign mobile network. The assignment is made, for example, by means of the telephone number and/or the IMEI number of the first SIM card 2; see step 105 in FIG. 2.

For this purpose, the mobile communications gateway 4 comprises means that are suitable for detecting a message 13 sent by the mobile communications terminal 1 to the mobile communications gateway 4, and means which use the information contained in the message to assign to the second SIM card 3 and/or to the second telephone number, which is assigned to said SIM card, a TC connection routed to the mobile communications gateway 4. These means are implemented, for example, by a microprocessor, a memory chip and suitable software, and, for example using an association table, check to which telephone number incoming calls must be forwarded.

In step 106, the temporary telephone number of the mobile communications terminal 1 can now be used to forward the received TC connection from the mobile communications gateway 4 to the mobile communications terminal 1 located abroad.

It is particularly provided in this case that an incoming call shown by arrow 11 in FIG. 1 is routed to the foreign mobile network via a TDM network, i.e. an international fixed network, and then delivered to the mobile communications terminal 1 via this foreign mobile network.

This has the associated advantage that the call data is transferred at low cost via a TDM network, at any rate at low cost compared with costs arising from roaming abroad. It is equally possible, however, to forward the TC connection to the mobile communications terminal 1 via a communications network other than a TDM network, for example via the Internet or another IP network.

Thus in one embodiment, the method according to the invention is based on the idea of registering a partner SIM card to the first SIM card at the mobile communications gateway 4 instead of at the current location of the mobile communications terminal 1, and routing the TC connection then routed to the mobile communications gateway 4 via a low-cost network to the temporary number of the mobile communications terminal 1 temporarily registered in a foreign mobile network.

The method described with reference to FIG. 1 can also have a plurality of variations. For example, it can be provided that instead of registering a partner SIM card at the mobile communications gateway 4, permanent call forwarding is already configured in a SIM card in the mobile communications gateway 4 before the SIM card in the mobile communications terminal 1 is replaced. This also accomplishes that each TC connection addressed to the first telephone number is routed to the mobile communications gateway 4. The rest of the method is then the same as described above. The call forwarding can be configured manually, for instance, or likewise by the aforementioned software application. Configuring permanent call forwarding does not here result in additional costs, because according to the applicable standards, roaming costs are not applied to permanent call forwarding.

In a further alternative, the message provided in the mobile communications terminal 1 is not transmitted to the mobile communications gateway 4 as an SMS but in another way, for example as a data packet or via the Internet.

It is pointed out that the term "routing" and "forwarding" of a TC connection is understood to mean that both the signaling data associated with a TC connection and the actual user data (call data, SMS messages) are routed via the communications equipment and networks that are involved in each case. Thus routing and forwarding a TC connection not only relates to routing and forwarding signaling data but also the actual user data. The call itself is routed via the gateway 4 to the temporary telephone number of the mobile communications terminal 1.

The solution according to the invention results in significant cost savings for telephone calls abroad. The following example shows the cost saving based on current tariffs in the holiday destination of Egypt.

TABLE 1

Telephone costs in Egypt as example

| Date Jan. 2, 2011 | Time | Telekom | Vodafone | Eplus | O2 |
|---|---|---|---|---|---|
| Cellphone call from Germany (Egyptian number called) | 60/60 | 1.99€ | | | |
| Fixed network call from Germany (Egyptian number called) | 60/60 | 0.60€ | | | |
| Roaming charges for calls from Germany (called subscriber in Egypt) | 60/60 | 1.79€ | 1.53€ | 1.79€ | 1.59€ |

TABLE 1-continued

Telephone costs in Egypt as example

| Date Jan. 2, 2011 | Time | Telekom | Vodafone | Eplus | O2 |
|---|---|---|---|---|---|
| Calls to Germany (from German called subscriber in Egypt to Germany) | 60/60 | 2.99€ | 2.55€ | 2.59€ | 2.99€ |
| Calls in Egypt (from German called subscriber in Egypt to Egypt) | 60/60 | 2.99€ | 2.55€ | 2.59€ | 2.99€ |

Saving for 100 Minutes Incoming and 100 Minutes Outgoing (Called Subscriber Located in Egypt):

| | |
|---|---|
| accepted calls (100 minutes) | 179.00€ |
| outgoing calls (100 minutes) | 299.00€ |
| less 200 minutes of fixed network costs arising (60 Euro cents) | −120.00€ |
| Total saving for 200 minutes (about 2 weeks) | 358.00€ |

This calculation does not take into account the costs for the prepaid card 3, which are negligible however.

The method according to the invention can likewise be used for incoming SMS messages. Incoming SMS messages are likewise forwarded via the mobile communications gateway 4 to the mobile communications terminal 1 containing the local SIM card 3. In one embodiment variant, the original sender address is here integrated in the SMS text at the gateway 4.

In addition, outgoing calls can also be implemented at low cost by the described method by means of data transfer from the mobile communications gateway 4 to the mobile communications terminal 1 via a fixed network or IP network. This is achieved by means of callback or a multi-stage dialing process such as e.g. "two-stage dialing". An appropriate callback or a multi-stage dialing process can be facilitated here by means of the aforementioned software application in the mobile communications terminal 1.

A callback is made from the mobile communications gateway 4 via the fixed network or an IP network. In this case, the mobile communications terminal 1 first calls the mobile communications gateway 4 by means of the software application. This can be done via a telephone call to the partner SIM card or alternatively via an SMS which is sent to the partner SIM card (or a specific card managed by the SIM server 8). A callback is thereupon implemented.

Outgoing SMS messages, on the other hand, cannot be carried via a fixed network and so therefore need a standard mobile communications connection for transmission. Even so, when using a partner SIM card in the mobile communications gateway 4, the SMS can be forwarded together with the correct sender address in the home network 7. The SMS is thus first forwarded from the mobile communications terminal 1 by means of international roaming to the mobile communications gateway 4, which then forwards the SMS to the mobile communications terminal 6, adding the correct sender address in the process.

The embodiment of the invention is not limited to the exemplary embodiments described above, which are merely to be understood as examples. For example, the message generated in the mobile communications terminal 1 on replacement of the SIM card can contain different and/or additional information. In addition, each data transfer that is made between the mobile communications terminal 1 and the mobile communications gateway 4 can be performed in a different way and/or via different networks.

The invention claimed is:

1. A method for routing telecommunication connections (TC connections) to a mobile communications terminal located in the reception area of a current mobile network that differs from a home network of the mobile communications terminal, wherein the mobile communications terminal firstly has a first SIM card, which is assigned to the home network and to which is assigned a first telephone number, and wherein the method comprises the following steps:
  replacing the first SIM card in the mobile communications terminal by a second SIM card, which is assigned to the current mobile network and to which is assigned a second telephone number,
  actuated by replacing the SIM card, automatically generating in the mobile communications terminal a message comprising at least:
  the second telephone number, which is assigned to the second SIM card, and
  at least one piece of information identifying the replaced SIM card,
  sending the message from the mobile communications terminal to a mobile communications gateway,
  routing each TC connection addressed to the first telephone number to the mobile communications gateway,
  using the information contained in the message to assign such a TC connection to the second SIM card and/or to the second telephone number, which is assigned to the second SIM card, and
  using the second telephone number contained in the message to forward such a TC connection to the current mobile network, from the mobile communications gateway, via at least one communications network, and delivering the TC connection, via the current mobile network, to the mobile communications terminal equipped with the second SIM card.

2. The method as claimed in claim 1, wherein a TC connection addressed to the first telephone number is routed to the mobile communications gateway by registering, when the message is received at the mobile communications gateway, the mobile communications terminal in the home network at the location of the mobile communications gateway by means of a SIM card of the mobile communications gateway.

3. The method as claimed in claim 2, wherein a partner SIM card to the replaced SIM card is used to register the mobile communications terminal in the home network, wherein the partner SIM card is located in the mobile gateway or is assigned thereto via a SIM server.

4. The method as claimed in claim 1, wherein a TC connection addressed to the first telephone number is routed to the mobile communications gateway in that the mobile communications terminal, before the SIM card is replaced, configures permanent call forwarding to the mobile communications gateway.

5. The method as claimed in claim, wherein at least one piece of information identifying the replaced SIM card is the first telephone number, which is assigned to the replaced SIM card, and/or at least one piece of identification information relating to the replaced SIM card.

6. The method as claimed in claim 5, wherein the message that is automatically generated in the mobile communications terminal contains at least the second telephone number which is assigned to the second SIM card, and the IMSI of the first, replaced SIM card.

7. The method as claimed in claim 1, wherein the second SIM card is a prepaid SIM card.

8. The method as claimed in claim 1, characterized in that wherein the message that is automatically generated in the mobile communications terminal is sent as an SMS message to the mobile communications gateway.

9. The method as claimed in claim 1, wherein the message that is automatically generated in the mobile communications terminal is sent directly to the mobile communications gateway.

10. The method as claimed in claim 1, wherein the message that is automatically generated in the mobile communications terminal is sent via a SIM server to the mobile communications gateway.

11. The method as claimed in claim 1, wherein a TC connection is forwarded from the mobile communications gateway to the second telephone number, which is assigned to the second SIM card, via a fixed telecommunication network and/or the Internet connected therebetween.

12. The method as claimed in claim 3, wherein the partner SIM card is arranged in the SIM server, and the data in the partner SIM card that is relevant to an authentication is transferred to the mobile communications gateway when the message generated in the mobile communications terminal is received at the mobile communications gateway and/or at the SIM server.

13. The method as claimed in claim 1, wherein outgoing TC connections from the mobile communications terminal are implemented by means of callback or a multi-stage dialing process with the mobile communications gateway connected therebetween.

14. The method as claimed in claim 1, wherein the TC connections under consideration are telephone calls and/or SMS messages.

15. The method as claimed in claim 1, wherein the mobile communications terminal is initially located in a foreign country in relation to the country containing the home network of the mobile communications terminal, wherein the current mobile network is a foreign mobile network, and the first SIM card is replaced by a second SIM card, which is assigned to the foreign mobile network.

16. A mobile communications gateway comprising:
a plurality of radio modules for mobile communication, wherein a plurality of SIM cards are assigned or can be assigned to the mobile communications gateway, each of which enable use of a radio module for mobile communication,
means that are suitable for detecting a message sent from a mobile communications terminal to the mobile communications gateway, which message comprises the following information:
the telephone number of a second SIM card, which is assigned to a current mobile network, wherein a first SIM card, which was originally inserted in the mobile communications terminal and is assigned to a home network, has been replaced by the second SIM card and
at least one piece of information identifying the replaced SIM card,
means which use the information contained in the message to assign to the second SIM card and/or to the second telephone number, which is assigned to said SIM card, a TC connection addressed to the first telephone number of the mobile communications terminal and routed to the mobile communications gateway, and
means which use the second telephone number contained in the message to forward to the mobile communications terminal equipped with the second SIM card assigned to the current mobile network, via a communication network, a TC connection addressed to the first telephone number of the mobile communications terminal and routed to the mobile communications gateway.

17. The mobile communications gateway as claimed in claim 16, wherein a SIM card that is the partner SIM card to the first SIM card of the mobile communications terminal is assigned to the mobile communications gateway, wherein the partner SIM card is registered in the home network anyway when the messnu is received, so that each TC connection addressed to the first telephone number is routed to the mobile communications gateway.

18. The mobile communications gateway as claimed in claim 17, wherein the mobile communications gateway is designed such that at least some of the functions of the mobile communications gateway are supervised via a SIM serve, in particular the mobile communications gateway receives from a SIM server the data of a partner SIM card that is relevant to an authentication, wherein the partner SIM card is arranged in the SIM server.

19. A mobile communications terminal comprising:
means which detect a replacement of a first SIM card, which is assigned to a home network by a second SIM card, which is assigned to a current mobile network,
means which, actuated by the replacement of the SIM card, automatically generate a message that comprises at least:
a second telephone number, which is assigned to the second SIM card, and
at least one piece of information identifying the replaced SIM card,
means which, after the SIM card is replaced, send the message from the mobile communications terminal to a defined telephone number that is assigned to a mobile communications gateway; and
means for receiving from the mobile gateway, at the current mobile network via a communication network, a TC connection addressed to the first SIM card.

20. The mobile communications terminal as claimed in claim 19, wherein the means which automatically generate a message are designed to detect the IMEI of the first SIM card and after the SIM card is replaced to write the IMEI in the message.

21. The mobile communications terminal as claimed in claim 19 wherein the means which automatically generate a message generate the message in the form of an SMS message, wherein the new telephone number, which is assigned to the second SIM card, is provided by the sender information in the SMS message.

22. The mobile communications terminal as claimed in claim 19 wherein the respective means are provided by a software application of the mobile communications terminal.

* * * * *